Figure 1:
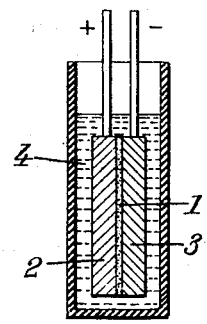

April 26, 1960  G. NEUMANN  2,934,580
ELECTROLYTIC CELL, PARTICULARLY ACCUMULATOR CELL
Filed Jan. 14, 1955

United States Patent Office 2,934,580
Patented Apr. 26, 1960

2,934,580
ELECTROLYTIC CELL, PARTICULARLY ACCUMULATOR CELL

Georg Neumann, Heilbronn (Neckar), Germany, assignor to "Bureau Technique Gautrat," Les Lilas (Seine), France, a French society Application January 14, 1955, Serial No. 481,937

Claims priority, application France January 16, 1954

21 Claims. (Cl. 136—6)

The present invention relates essentially to alkaline electrolytic storage cells or accumulators.

When a battery of such accumulator cells connected in series is discharged, an undesirable polarity reversal may occur in some of the cells when said cells become fully discharged before the other cells connected in series therewith are themselves fully discharged. This polarity reversal, which has in all cases a detrimental effect, is especially objectionable in the case of gas-tight cells because polarity reversal then causes hydrogen to be formed on the previously positive electrode and it may be difficult subsequently to get rid of this hydrogen even when the original polarity of the electrodes is restored. This case of full discharge of some of the cells at a time when other cells connected in series with the first mentioned ones are still charged, occurs chiefly when the cells have different capacities; this difference between the capacities may be very small and due to manufacturing conditions, notwithstanding the fact that the cell capacities should be theoretically equal. The same difficulty may occur when a portion of the battery formed by the cells in series has been subjected to a higher discharge than another portion of the same battery, for instance when only part of the battery has been used.

The chief object of my invention is to prevent the recited undesirable polarity reversal of those cells which have become fully discharged at a time when other cells of the same battery are not yet fully discharged.

Other objects and advantages will be apparent from a consideration of the specification and claims.

According to my invention I provide between electrodes of opposed polarities of the alkaline electrolytic cells an intermediate layer impregnated with electrolyte and containing at least one metallic compound which is non conductive or of low conductivity and which, when the polarity of said electrodes is reversed, is reduced to metal or otherwise converted to an electrically conducting state and thereby produces an electrically conducting connection or bridge between the electrodes. Preferably, the negative electrode should have a capacity (viz. an amount of active material) higher than that of the positive electrode so that said negative electrode remains still charged when the positive electrode is fully discharged.

In order to disturb as little as possible the optimum conditions of the cell, it may be of advantage to arrange the temporary electrically connecting bridge not between the main electrodes but to provide auxiliary electrodes between which said bridge is formed. In this way, it is possible to establish the most favorable adjustment of the potential separately for the main electrodes and for the bridge formation between the auxiliary electrodes.

As bridge forming compounds I use preferably compounds of such metals, which form the active mass of the electrode or part thereof. Said compounds should be substantially insoluble in the electrolyte. Suitable compounds are the oxides and hydroxides, for instance in the case of cadmium electrodes, the cadmium oxide or hydroxide.

The effect of the intermediate layer according to the invention is as follows:

In a storage battery or accumulator cell, the portion of the layer which is immediately in contact with the negative electrode is reduced to metal by the charging current fed to said electrode, whereas that portion of the layer which is in contact with the positive electrode undergoes no transformation and thus keeps its non-conductive properties. The reduction of the oxide or hydroxide progresses toward the positive electrode, but it is stopped at a point in close proximity to said electrode by the positive and oxidizing potential thereof whereby, during charging, practically no electrically conducting connection is produced between the electrodes of opposed polarities. If the accumulator is then discharged, the portion of the intermediate layer which was previously reduced to meal, becomes partly and gradually oxidized, but this portion retains some conductivity as long as the negative electrode has not yet been fully discharged. When this last mentioned electrode has a capacity higher than that of the positive electrode, the above mentioned portion of the intermediate layer is still conductive when, during the full discharge of the accumulator cell, the positive electrode has become fully discharged. If, then, a current still flows through the accumulator cell in the direction of discharge, the electrode which is normally positive assumes a potential which is equal to, or even more negative than, that of the negative electrode. From this time on, reduction takes place also in the portion of the intermediate layer which is in immediate contact with the positive electrode and which had undergone no reduction during the preceding charging operation, and this portion of the intermediate layer forms with the already previously reduced portion a conductive connection or bridge between the two electrodes of opposed polarity. From this time on the electrodes of the accumulator cell are short-circuited by said conductive bridge, and the undesirable effect of the polarity reversal is eliminated.

If subsequently a current is passed through the short-circuited electrodes in the charging direction, the slight ohmic resistance of the connecting bridge produces a potential difference, which causes oxidizing conditions at the positive electrode; as a result, the electrically conducing bridge at said electrode is oxidized and thus breaks the short-circuit. Thereupon, the charging operation may proceed normally and the accumulator cell will be recharged. Said cycle of bridge formation on reversal of the polarity of the electrodes and breaking of the bridge connection on charging is automatically maintained throughout the life of the cell.

If the charging current is low it may happen that the ohmic resistance of the bridge and the potential difference thus created is not sufficient to oxidize quickly the portion of said bridge adjoining the positive electrode; in such case, special means may be provided to increase said potential difference. For this purpose I may for instance increase the resistance of the intermediate layer by incorporating therein substances which are not conductive and cannot become conductive under the effect of the current flow. I may also, for the same purpose, insert a resistor between the negative electrode and the intermediate layer. When the negative electrode is an auxiliary electrode it may be made of a material having a relatively high resistivity, and in particular the negative auxiliary electrode may be made of a semi-conductive substance such as carbon or the like.

Furthermore, it may be of advantage to include in the intermediate layer a small amount of finely divided conductive materials such as silver or bismuth in order to facilitate the partial reduction of the intermediate layer during the first charging of the accumulator. Preferably all the components of the intermediate layer should be intimately mixed together in a finely divided state, whereby care must be taken that metallic additions do not form by themselves an electrically conductive connection between the electrodes. For this purpose, the components may be mixed in the form of salts in solution, from which the oxides or hydroxides are precipitated, for instance by alkali.

When the intermediate layer is disposed not between the main electrodes but between auxiliary electrodes distinct from the main electrodes and connected in shunt therewith, I obtain the advantage that I can form the auxiliary electrodes independently of the main electrodes, thus obtaining, for each of these two sets of electrodes, the best possible adjustment of their potential.

When the invention is used in connection with alkaline accumulators the positive electrode of which is essentially constituted by nickel oxide and the negative electrode of which is essentially constituted by cadmium or iron, it is advantageous to constitute the intermedite layer essentially of cadmium hydroxide. To this cadmium hydroxide I may add, in order to increase the resistance of the intermediate layer which becomes conductive by reduction of the cadmium hydroxide, non conductive and non reducible oxides or hydroxides such as magnesium hydroxide or other materials, for instance also organic substances, which are not conductive and cannot be attacked by the electrolyte. I may, for instance, prepare the mixture forming the intermediate layer as follows, whereby I add also a small amount of silver in order to facilitate, during the first charging of the accumulator, partial reduction of the cadmium hydroxide:

I mix 50 cm.$^3$ of a saturated solution of cadmium nitrate $Cd(NO_3)^2$, 50 cm.$^3$ of a saturated solution of magnesium nitrate $Mg(NO_3)^2$ and 1 cm.$^3$ of a saturated solution of silver nitrate $AgNO_3$. I precipitate in this mixture, by means of caustic soda (NaOH) or potash (KOH) to which a reducing agent, for instance formaldehyde, may be added, the metallic hydroxides (cadmium and magnesium hydroxide) and silver intimately mixed with each other in a finely divided state. After washing I remove a sufficient amount of water to obtain a paste which can be spread. This paste is for instance forced into the meshes of a fabric capable of acting as a support. The paste is caused or allowed to dry, whereupon the structure thus obtained is placed between electrodes of opposed polarity and these electrodes are brought into close spaced relationship so as to obtain an intimate contact thereof with the paste incorporated in the fabric.

According to a modification, the support constituted by the fabric may be impregnated with the above mentioned mixture of salts in solution and the hydroxides and silver are precipitated in the fabric itself.

I may also dispose the materials forming the intermediate layer between the electrodes of opposed polarity without making use of a special support, particularly when the electrodes are auxiliary electrodes. The intermediate layer will then advantageously be applied on one of the two electrodes.

Preferred embodiments of my invention will be hereinafter described with reference to the accompanying drawings given merely by way of example and in which Figs. 1 to 5 are diagrammatic sections of accumulator cells made according to the invention.

Fig. 1 shows an accumulator cell which includes between the two main electrodes 2 and 3 an intermediate layer 1 prepared as set forth hereinabove and disposed for instance on a fabric support, the negative electrode 3 having a capacity higher than that of the positive electrode 2. The intermediate layer is in contact over its whole area with electrodes 2 and 3. The assembly formed by the electrodes and the intermediate layer is immersed in the electrolyte 4, which thus impregnates the intermediate layer.

It should be noted that the intermediate layer need not extend over the whole area of electrodes 2 and 3 but may extend only over relatively small portions of said area. When this intermediate layer is incorporated in a fabric support arranged as a separator, it is not necessary to provide the material forming the intermediate layer over the whole surface of the separator, but only in portions thereof.

Figure 2:
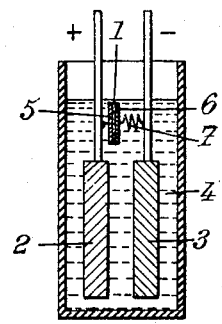

In the accumulator cell shown by Fig. 2, the intermediate layer 1 is not located between the two main electrodes 2 and 3 but between two auxiliary electrodes 5 and 6 one of which, 5, is connected with the main positive electrode 2 and the other, 6, with the main negative electrode 3. Auxiliary electrodes 5, 6 and main electrodes 2, 3 are located inside the same electrolyte 4 and the same container. In this construction, the capacity of the auxiliary electrodes may be practically equal to 0.

In the construction of Fig. 2 I insert between the auxiliary negative electrode 6 and the main negative electrode 3 a resistor 1 which has the following function: When electrodes which are initially short-circuited due to the previous complete discharge of the accumulator cell are recharged, the entire intermediate layer acquires a potential which is positive with respect to the main negative electrode, whereby a rapid oxidization of the conductive portions of the intermediate layer and therefore an immediate break of the short-circuit is obtained. Instead of using a special resistance 7 I may also make the negative electrode 6 itself of a semi-conductive substance such as carbon or an equivalent material in order to give the intermediate layer during recharging a potential which is positive with respect to the auxiliary negative electrode.

Figure 3:
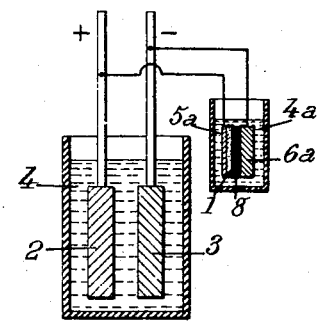

The construction of Fig. 3 differs from that of Fig. 2 chiefly in that the auxiliary electrodes 5a, 6a between which the intermediate layer 1 is provided, are not disposed in the same electrolyte nor in the same container as the main electrodes, but are maintained in shunt with respect to the main electrodes in a special auxiliary vessel which contains a special electrolyte 4a. In this case, the auxiliary negative electrode 6a must have a capacity higher than that of the auxiliary positive electrode 5a.

According to the construction of Fig. 3 I interpose between the auxiliary negative electrode 6a and the intermediate layer 1 a semi-conductive layer 8 having a resistance sufficient to give the intermediate layer, during accumulator recharging, a positive potential with respect to the auxiliary and main negative electrodes.

Figure 4:
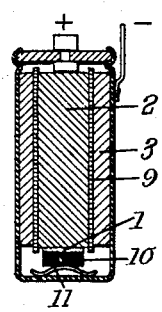

Fig. 4 shows a constantly gas-tight closed accumulator according to the invention. 2 is the main positive electrode and 3 the main negative electrode which surrounds electrode 2 at a distance therefrom. Between these two electrodes there is provided a separator 9 impregnated with an electrolyte. The intermediate layer 1 is disposed in contact with the lower face of the main positive electrode 2. In contact with this intermediate layer and on the underside thereof, there is provided a plate 10 made of a semi-conductive substance such as carbon and connected through a contact spring 11 with the main negative electrode 3 the capacity of which is higher than that of the main positive electrode 2.

Figure 5:
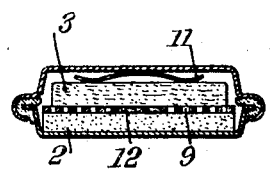

Fig. 5 shows another gas-tight accumulator the positive and negative electrodes of which are designated by 2 and 3 respectively. Separtor 9 which is placed between these electrodes and is impregnated with the electrolyte has, incorporated therein, in its middle portion, a material 12 capable of short-circuiting the two electrodes, this material being embedded in the separator which acts as a support for it.

In the above description I have supposed that there is only one pair of main electrodes. Of course, my invention would apply as well to the case where each main electrode consists of several plate elements electrically connected together.

When auxiliary electrodes are used, these electrodes and the layer interposed between them should advantageously be made as a single unit, for instance as follows.

A filtering paper approximately 0.1 mm. thick is dipped in a bath made of the following saturated solutions: 4 parts of cadmium nitrate, 5 parts of magnesium nitrate, and 1 part of nickel nitrate. Then this paper is dipped in a caustic soda solution of 20% concentration, impregnated with water, dried and once more dipped in the above mentioned bath. A single layer of the paper thus treated is placed around the positive electrode, made of a nickel sheet and the whole is inserted in the negative electrode, made of an iron sheet or a nickel sheet shaped to form a rectangular casing. The unit thus constituted, after it has been subjected to a pressure of 100 kgs. per sq. cm., is subjected for twenty hours to the action of a current of 20 ma. per sq. cm. The unit thus finally obtained may then be incorporated in the cells. It should be noted that in order to obtain a capacity of one ampere-hour 0.3 sq. cm. of interposed layer is required to form the connection "bridge."

If the bridge is to be used in a gas-tight cell, the accumulator electrodes must, at the time the cell is closed, be in the desired state of charge, i.e. when the positive electrode is fully charged, the negative electrode must still retain some active material still uncharged, whereas when the positive electrode is fully discharged the negative electrode must still retain some active material still charged. For instance if the desired state of charge is to be obtained in an accumulator having a useful charge capacity of 3 amperes-hour, and if the positive electrode has a corresponding charge capacity of 3 amperes-hour and the negative electrode a charge capacity of 5 amperes-hour, then at the time of closing the cell the positive electrode may be fully charged if the negative electrode is charged to 4 amperes-hour.

Though I have described my invention with specific reference to alkaline gas-tight accumulator cells, it is to be understood that the principle of temporary conductive bridge formation on reversal of the polarity and breaking said conductive connection may be also applied to open cells and to so-called polarization cells, which are inserted in an electric circuit to maintain the voltage in said circuit at a constant value, and generally to electrolytic cells of any type.

What I claim is:

1. An alkaline storage battery cell comprising a positive electrode, a negative electrode having a greater charge capacity than said positive electrode, a form-stable layer intermediate of, and in electrically conductive contact with, said electrodes, said layer being impregnated with an alkaline electrolyte containing a reducible cadmium compound selected from the group consisting of cadmium oxide and cadmium hydroxide as contiguous particles forming electrically conducting bridge-like connections between said electrodes when their polarities are reversed, and electrical resistance means supplementing during recharge of the cell the resistance of said intermediate layer to produce an oxidizing potential at said positive electrode, said electrically conducting connections between the electrodes being broken by reoxidation of the cadmium when the original polarity of the electrodes is restored.

2. A cell according to claim 1, wherein said resistance means is interposed between said electrolyte and said negative electrode.

3. A cell according to claim 2, wherein said resistance is constituted by a plate of a semi-conductive substance.

4. A cell according to claim 2, wherein said resistance is constituted by a plate of carbon.

5. A cell according to claim 1 in which said electrolyte contains, in addition to said reducible cadmium compound, at least one permanently non conductive substance.

6. A cell according to claim 1 in which said electrolyte contains, in addition to said reducible cadmium compound, at least one oxide which cannot be reduced by a reversal of polarities of said electrodes.

7. A cell according to claim 1 in which said electrolyte contains, in addition to said cadmium compound, at least one organic insulating body which is not attacked by said electrolyte.

8. A cell according to claim 1 in which said electrolyte contains, in addition to said cadmium compound, a small amount of an electrically conductive substance.

9. A cell according to claim 1 in which said electrolyte and cadmium compound are used in form of a homogeneous mixture containing, in addition, at least one substance which is permanently an insulator and at least one substance which is permanently a conductor.

10. A cell according to claim 1 including an insulating supporting body arranged to form a separator to fix said electrolyte and in which said cadmium compound is embedded.

11. A cell according to claim 1 including a fabric arranged to form a separator to fix said electrolyte and in which said cadmium compound is embedded.

12. A cell according to claim 1 including an insulating supporting body arranged to form a separator to fix said electrolyte and in which said cadmium compound is embedded, said cadmium compound being located only at some points of said separator.

13. A cell according to claim 1 in which said electrolyte contains a mixture of cadmium hydroxide, magnesium hydroxide and a small amount of silver.

14. An alkaline storage battery cell which comprises, in combination, a casing, an alkaline electrolyte in said casing, a main negative electrode containing as active material a member of the group consisting of cadmium and iron and a main positive electrode containing nickel oxide, said electrodes being in contact with said electrolyte, an auxiliary negative electrode and an auxiliary electrode both of small capacity each connected with one of said main electrodes respectively and, interposed between said auxiliary electrodes and in contact therewith, an immobilized alkaline electrolyte containing in the form of contiguous particles a reducible cadmium compound substantially insoluble in the electrolyte and selected from the group consisting of cadmium oxide and cadmium hydroxide, said cadmium compound being reduced to an electrically conducting bridge of metallic cadmium between said auxiliary electrodes when their polarities are reversed, which bridge is broken by reoxidation of the cadmium at the positive auxiliary electrode when the original polarity of said electrodes is restored; said cell further comprising electrical resistance means supplementing during recharge of the cell the resistance between said auxiliary electrodes to produce an oxidizing potential at said positive auxiliary electrode, the combined capacities of the negative electrodes being higher than the combined capacities of the positive electrodes.

15. A storage battery cell according to claim 14 further including a resistance between said auxiliary negative electrode and said main negative electrode.

16. A storage battery cell according to claim 14 wherein said auxiliary negative electrode is made of a semi-conductive material.

17. An alkaline storage battery cell which comprises, in combination, a main casing, an alkaline electrolyte in said main casing, a main negative electrode containing as active material a member of the group consisting of cadmium and iron and a main positive electrode containing nickel oxide, said electrodes being in contact with said electrolyte, an auxiliary casing, two auxiliary electrodes of small capacity located in said auxiliary casing, said auxiliary electrodes being one positive and one negative electrode connected to the main positive and the main negative electrode, respectively, the capacity of the negative auxiliary electrode being higher than that of the positive auxiliary electrode, a form-stable layer of an alkaline electrolyte interposed between said auxiliary electrodes, said layer containing dispersed therein contiguous particles of a cadmium compound substantially insoluble in the electrolyte and selected from the group consisting of cadmium oxide and cadmium hydroxide, said cadmium compound having at most a low conductivity but being reduced to metallic cadmium and forming electrically conductive bridges between said auxiliary electrodes when their polarities are reversed, and electrical resistance means supplementing during recharge of the cell the resistance between said auxiliary electrodes to produce an oxidizing potential at said positive auxiliary electrode.

18. A cell as claimed in claim 10 wherein said separator is in direct contact with said electrodes.

19. A cell as claimed in claim 10 wherein a layer of increased resistance is provided between said separator and said negative electrode.

20. An alkaline storage battery cell which comprises, in combination, a main casing, an electrolyte in said main casing, a main negative electrode and a main positive electrode, said electrodes being in electrically conductive contact with said electrolyte, an auxiliary casing, auxiliary electrodes of opposed polarity located in said auxiliary casing, the positive one being connected to the main positive electrode and the negative one being connected to the main negative electrode, the capacity of the negative auxiliary electrode being higher than that of the positive auxiliary electrode, a substantially immobilized alkaline electrolyte between said auxiliary electrodes and containing dispersed therein contiguous particles of a cadmium compound substantially insoluble in the electrolyte and selected from the group consisting of cadmium oxide and cadmium hydroxide, said cadmium compound having at most a low conductivity and being capable of being reduced and forming electrically conductive bridges between said auxiliary electrodes when their polarities are reversed, and electrical resistance means supplementing during recharge of the cell the resistance between said auxiliary electrodes to produce an oxidizing potential at said positive auxiliary electrode.

21. In the operation of an alkaline storage battery of the nickel oxide-iron and nickel oxide-cadmium type consisting of a plurality of cells in which the negative electrode has an excess of charge capacity and a form-stable alkaline electrolyte is provided between the electrodes, the method of preventing polarity reversal in fully discharged cells connected in series with not yet discharged cells, which method comprises adding to said alkaline electrolyte a substantially insoluble cadmium compound selected from the group consisting of cadmium oxide and cadmium hydroxide in the form of contiguous particles forming non-conductive bridges between the electrodes, reducing said particles on polarity reversal to a metallic cadmium bridge short-circuiting the cell, and re-oxidizing at least part of said bridge-forming cadmium and destroying said short-circuiting bridge connection on charging the cell.

References Cited in the file of this patent

UNITED STATES PATENTS

| | | |
|---|---|---|
| 499,848 | Norton | June 20, 1893 |
| 858,862 | Edison | July 2, 1907 |
| 2,104,973 | Dassler | Jan. 11, 1938 |
| 2,131,592 | Lange et al. | Sept. 27, 1938 |
| 2,614,138 | Jacquier | Oct. 14, 1952 |
| 2,634,303 | Moulton | Apr. 7, 1953 |
| 2,646,455 | Jeannin | July 21, 1953 |
| 2,653,180 | Hignett et al. | Sept. 22, 1953 |